United States Patent
Brück et al.

(10) Patent No.: US 7,700,050 B2
(45) Date of Patent: Apr. 20, 2010

(54) COATED HONEYCOMB BODY ASSEMBLY WITH MEASUREMENT SENSOR AND EXHAUST SYSTEM HAVING THE ASSEMBLY

(75) Inventors: Rolf Brück, Bergisch Gladbach (DE); Peter Hirth, Köln (DE); Jörg-Roman Konieczny, Siegburg (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 974 days.

(21) Appl. No.: 11/393,960

(22) Filed: Mar. 30, 2006

(65) Prior Publication Data

US 2006/0165567 A1    Jul. 27, 2006

Related U.S. Application Data

(63) Continuation of application No. PCT/EP2004/10452, filed on Sep. 17, 2004.

(30) Foreign Application Priority Data

Sep. 30, 2003    (DE)  ................................. 103 45 896

(51) Int. Cl.
     *B01D 50/00*    (2006.01)
(52) U.S. Cl. ....................................................... 422/180
(58) Field of Classification Search ................. 422/168, 422/177, 180; 60/274, 276
See application file for complete search history.

(56) References Cited

U.S. PATENT DOCUMENTS

| | | | |
|---|---|---|---|
| 3,841,839 A | * | 10/1974 | Wiley ........................... 422/179 |
| 4,118,199 A | * | 10/1978 | Volker et al. ................. 422/171 |
| 4,803,189 A | | 2/1989 | Swars |
| 4,832,998 A | | 5/1989 | Cyron |
| 4,923,109 A | | 5/1990 | Cyron |
| 4,946,822 A | | 8/1990 | Swars |
| 5,018,348 A | | 5/1991 | Dürschmidt et al. |
| 5,105,539 A | | 4/1992 | Maus et al. |
| 5,403,559 A | * | 4/1995 | Swars ........................... 422/180 |
| 5,514,347 A | * | 5/1996 | Ohashi et al. ................ 422/174 |
| 5,648,050 A | | 7/1997 | Matsumoto et al. |
| 6,087,298 A | * | 7/2000 | Sung et al. ................... 502/333 |

(Continued)

FOREIGN PATENT DOCUMENTS

DE      88 16 154      2/1989

(Continued)

OTHER PUBLICATIONS

Japanese Office Action dated Sep. 25, 2009.

*Primary Examiner*—Tom Duong
(74) *Attorney, Agent, or Firm*—Laurence A. Greenberg; Werner H. Stemer; Ralph E. Locher (57) ABSTRACT

A honeycomb body assembly includes a honeycomb body with channels through which a fluid can flow. The channels extend between two end faces. At least one sensor extends at least partly into the honeycomb body. A first partial volume of the honeycomb body is defined between a first end face and the at least one first sensor. The honeycomb body has a lower capacity for oxygen in the first partial volume than in at least one further partial volume. An exhaust system with a space-saving configuration of such a honeycomb body is also disclosed.

25 Claims, 2 Drawing Sheets

U.S. PATENT DOCUMENTS

| | | | |
|---|---|---|---|
| 6,516,610 B2 * | 2/2003 | Hodgson | 60/286 |
| 2003/0086837 A1 | 5/2003 | Brück et al. | |
| 2004/0159358 A1 * | 8/2004 | Bruck | 138/37 |
| 2005/0022382 A1 | 2/2005 | Bruck et al. | |

FOREIGN PATENT DOCUMENTS

| | | |
|---|---|---|
| DE | 38 41 685 A1 | 6/1990 |
| DE | 40 22 546 A1 | 1/1992 |
| DE | 195 22 913 A1 | 1/1996 |
| DE | 102 08 872 C1 | 8/2003 |
| DE | 203 09 398 U1 | 10/2003 |
| EP | 0 245 737 B1 | 9/1989 |
| EP | 0 430 945 B1 | 3/1992 |
| EP | 1 273 773 A2 | 1/2003 |
| EP | 1 273 773 A3 | 11/2003 |
| GB | 1 452 982 | 10/1976 |
| GB | 2 290 488 A | 1/1996 |
| JP | 62068543 A | 3/1987 |
| JP | 62071536 A | 4/1987 |
| JP | 08014029 A | 1/1996 |
| JP | 08150322 A | 6/1996 |
| JP | 11-107828 A | 4/1999 |
| JP | 2000502602 A | 3/2000 |
| JP | 2002512880 A | 5/2002 |
| JP | 2002-161740 A | 6/2002 |
| WO | 9723278 A1 | 7/1997 |
| WO | 9955459 A1 | 11/1999 |
| WO | WO 02/075126 A1 | 9/2002 |

\* cited by examiner

COATED HONEYCOMB BODY ASSEMBLY WITH MEASUREMENT SENSOR AND EXHAUST SYSTEM HAVING THE ASSEMBLY

CROSS-REFERENCE TO RELATED APPLICATION

This is a continuation, under 35 U.S.C. §120, of copending International Application PCT/EP2004/010452, filed Sep. 17, 2004, which designated the United States; this application also claims the priority, under 35 U.S.C. §119, of German Patent Application 103 45 896.4, filed Sep. 30, 2003; the prior applications are herewith incorporated by reference in their entirety.

BACKGROUND OF THE INVENTION

Field of the Invention

The invention relates to a honeycomb body assembly having a honeycomb body with passages through which a fluid can flow and which extend between two end faces, and at least one measurement sensor which at least partially extends into the honeycomb body. The invention also relates to an exhaust system which includes such a honeycomb body.

Honeycomb bodies, the basic structure of which is known, for example, from European Patent EP 0 245 737 B1, corresponding to U.S. Pat. Nos. 4,832,998, 4,803,189, 4,946,822 and 4,923,109; European Patent EP 0 430 945 B1; and UK Patent GB 1,452,982, are used for numerous applications in the automotive industry, in particular as catalyst carrier bodies in the treatment of exhaust gas. In view of the fact that permitted pollutant concentration limits in exhaust gas from an automobile released to the environment are being constantly reduced by legislation, methods which allow control of an exhaust-gas treatment process are becoming increasingly important. The measurement sensors which such control requires and which make it possible, for example, to determine the exhaust-gas composition or pollutant concentrations in the exhaust gas, are an important part of an exhaust-gas treatment system with controlled operation. Consequently, honeycomb bodies which are able to accommodate one or more measurement sensors and therefore provide data for controlling the catalytic treatment, as are known for example from German Utility Model 88 16 154 U1, are an important element in exhaust-gas treatment systems with controlled operation.

Suitable measurement sensors are, for example, sensors which are used to determine the exhaust-gas composition, such as for example lambda sensors and hydrocarbon sensors (HC sensors), which measure the hydrocarbon content of the exhaust gas. Furthermore, it is also possible to use what are known as nitrogen oxide sensors which determine the level of the nitrogen oxides in the exhaust gas.

Measurement sensors of that type are used in particular in conjunction with what is known as on-board diagnosis (OBD). The purpose of OBD is to continuously monitor the components which are of relevance to the exhaust gas in the vehicles, with the intention being to immediately recognize and indicate significant increases in emissions over the lifetime of each vehicle. That is intended to ensure permanently low exhaust-gas emissions.

When monitoring the functionality of a catalytic converter, it is preferable to determine the oxygen concentration in the exhaust gas upstream and downstream of the catalytic converter. To do that, it is customary for a lambda sensor for determining the oxygen content to be positioned upstream and downstream of a catalytic converter. With the aid of the lambda sensor disposed upstream of the catalytic converter, it is possible in particular to draw conclusions as to the air/fuel mixture fed to the internal combustion engine. The sensor connected downstream of the catalytic converter generates, for example, a comparison value based on the oxygen concentration in the exhaust gas, so that it is possible to draw conclusions as to the functionality of the catalytic converter. The oxygen is at least partially used to convert pollutants contained in the exhaust gas, and therefore a low concentration of oxygen at the outlet of the catalytic converter indicates effective conversion.

A particular problem with measurement sensors of that type, in addition to the additional space which they take up, is that they react very sensitively to different ambient conditions, as also occur under certain circumstances in exhaust systems. In particular, the sensitivity to water or water vapor needs to be mentioned, as well as the high temperatures prevailing in the aggressive environment, which can lead to undesirably rapid aging of the measurement sensor. However, in particular with a view toward OBD, it is necessary for the sensors for controlling the exhaust-gas properties and/or monitoring the components in the exhaust system to remain functional for a prolonged period of time.

SUMMARY OF THE INVENTION

It is accordingly an object of the invention to provide a coated honeycomb body assembly with a measurement sensor and an exhaust system having the assembly, which overcome the hereinafore-mentioned disadvantages of the heretofore-known devices of this general type with regard to placing measurement sensors in exhaust systems. In particular, it is intended to propose a position or form of configuration of measurement sensors which ensure long-term use of the measurement sensors in the exhaust system of mobile internal combustion engines. The intention is that measured value results which are as precise and accurate as possible and can be used to control the exhaust-gas components should be deliverable. Furthermore, it is intended to propose an exhaust system which has a particularly space-saving and functional configuration of a honeycomb body with a measurement sensor.

With the foregoing and other objects in view there is provided, in accordance with the invention, a honeycomb body assembly. The assembly comprises a honeycomb body having a first partial volume, at least one further partial volume, two end faces and passages through which a fluid can flow. The passages extend between the two end faces. At least one measurement sensor at least partially extends into the honeycomb body. The first partial volume is disposed between a first one of the two end faces and the at least one measurement sensor. The honeycomb body has a lower capacity to take up oxygen in the first partial volume than in the at least one further partial volume.

Further advantageous configurations are described below. At this point, it should be noted that the features disclosed below can be combined with one another in any technologically appropriate way, in particular even independently of the way in which they are described.

The honeycomb body can in principle be produced from various materials, in particular from ceramic or metallic material. It is preferably to be understood as a body which includes a multiplicity of passages that are disposed next to one another and extend substantially parallel to one another. The term passage does not necessarily mean a continuous flow passage or channel, but rather also encompasses other forms of flow paths through the honeycomb body. The most important criterion is that the fluid be divided into a multiplicity of partial fluid flows when it comes into contact with an end face of the honeycomb body. These partial fluid flows are routed separately from one another at least in the vicinity of the end faces, in particular for the first 2 mm to 3 mm. The term fluid in principle encompasses both gaseous and liquid substances, although in this context it is preferably a gas stream, in particular an exhaust-gas stream from a mobile internal combustion engine (spark-ignition engine or diesel engine or the like).

The at least one measurement sensor may be any known type of measurement sensor which is used in connection with the control or monitoring of exhaust-gas components of mobile internal combustion engines. This includes in particular lambda sensors, HC measurement sensors, temperature sensors, nitrogen oxide measurement sensors or the like. This at least one measurement sensor at least partially extends into the honeycomb body, in other words the at least one measurement sensor is placed against a peripheral or lateral surface of the honeycomb body and preferably extends radially inward. Reference is made to the explanations given below for a detailed description of the way in which it is actually disposed.

A first partial volume is defined by the first end face, which represents the gas entry side for the use of the honeycomb body in the exhaust system of a mobile internal combustion engine, and the at least one measurement sensor. The partial volume in particular includes all passages and their walls. It extends from the first end face as far as a cross section through the honeycomb body which is disposed parallel to the first end face and extends through the closest point of the measurement sensor to the first end face. Consequently, the first partial volume is described by the first end face, this cross section which has just been described and the peripheral or lateral surface of the honeycomb body in between.

According to the invention, the honeycomb body has a lower capacity to take up oxygen in this first partial volume than in at least one further partial volume. Therefore, it will firstly be clear that the first measurement sensor is located within the interior of the honeycomb body, i.e. deviates from the known principle of the measurement sensor connected upstream or downstream. The integration of the measurement sensor means that the latter is not directly exposed to the extreme thermal and dynamic stresses in the exhaust system of an internal combustion engine. In this way, it is possible in particular to reduce premature thermal aging and the risk of what is known as "water shocks", since the exhaust gas comes into contact with the honeycomb body first of all and only subsequently with the measurement sensor. With a view toward the use of a measurement sensor of this type as part of OBD, it is particularly important for the first measurement sensor, which is, for example, a lambda sensor, to come into contact with a composition of the exhaust-gas stream which still permits conclusions to be drawn as to the underlying air/fuel mixture. Therefore, it is proposed herein that the honeycomb body have a low capacity to take up oxygen in the partial volume. The result of this is that insufficient oxygen required for virtually 100% conversion of the pollutants contained in the exhaust-gas stream is available in this first partial volume. Consequently, the conversion rates are considerably lower in this first partial volume, for example less than 85%, in particular less than 75% and even less than 50%. Therefore, characteristic values of the exhaust gas which provide information as to the fuel/air mixture being used can still be recorded by the first measurement sensor. In accordance with another feature of the invention, the first partial volume at least in part has a first coating. A coating of this type is preferably applied to the passage walls and itself has a capacity to take up oxygen. The coating may be identical or different over the entire cross section and the entire length of the first partial volume in terms of its coating thickness, the type of coating, the coating surface area or further parameters. It is also possible for regions which do not have any coating to exist in the partial volume. Suitable coatings also include, for example, carrier layers for catalytically active materials, such as for example washcoat.

In accordance with a further feature of the invention, an exchange of fluid flows between adjacent passages is ensured in the first partial volume. In other words, the partial fluid flows which are formed in the vicinity of the end face of the honeycomb body are at least partially mixed with one another in the first partial volume. For this purpose, it is necessary for the passages disposed adjacent one another to be provided with measures which allow such an exchange of fluid flows.

In accordance with an added feature of the invention, in this context, at least in the first partial volume, apertures, in particular with a mean diameter in a range from 2 mm to 10 mm, are provided in the passage walls. The apertures can in principle include any conceivable shapes, in particular round, polygonal, oval or similar holes, slots, perforations or the like. In view of the wide range of forms which apertures of this type can take, a mean diameter is to be understood as meaning a mean value for the distance between the opposite edge of the apertures which lies between the maximum extent and the minimum extent. In this context, it should be noted that the apertures do not have to be formed uniformly over the partial volume, but rather it is possible for the apertures to be varied in terms of their form, size or distribution in the first partial volume.

In accordance with an additional feature of the invention, in order to ensure an exchange of fluid flows between adjacent passages, the apertures, at least in the first partial volume, are provided with microstructures, which are preferably used to divert the fluid in a direction that is transverse to an axis of the honeycomb body. A microstructure is to be understood in particular as meaning structures which, starting from the passage walls, extend into inner regions of the passage or toward adjacent passage walls. These microstructures preferably have a height which is less than the height of the passage itself. Suitable microstructures include studs, stamp formations, guide surfaces, vanes, grooves, bumps or the like.

Microstructures of this type are preferably used to generate pressure differences in adjacent passages which cause the partial fluid stream to flow from one passage to the adjacent passage. A suitable configuration of the microstructures with respect to one another allows uniform mixing of the fluid, with the result that, for example, regions with particularly high concentrations, as may for example also occur individually in exhaust-gas streams, are avoided. Rather, a virtually uniform concentration distribution of a pollutant or a component of the fluid over virtually the entire cross section of the honeycomb body is provided. If a fluid stream which has been mixed in this manner is brought into contact with the downstream measurement sensor, it is possible to provide more accurate statements as to the composition of the fluid stream.

In accordance with yet another feature of the invention, the first partial volume lies in a region of less than 30%, in particular in a region of from 10% to 25%, of the total volume of the honeycomb body. In this case, the total volume is to be understood as meaning the volume of the honeycomb body, which is defined by the two end faces and the peripheral or lateral surface and encompasses both the passages and their walls or coatings, etc. At this point, it should be noted that the honeycomb body does not necessarily have to be cylindrical in form. Rather, oval, conical, polygonal or similar shapes of honeycomb bodies are also known. If the honeycomb body has a housing, the housing does not count as part of the total volume of the honeycomb body.

In accordance with yet a further feature of the invention, the first partial volume has a length of from 10 mm to 40 mm, starting from the first end face. This length may be sufficient on one hand to provide a sufficient contact area for water vapor contained in the exhaust-gas stream or water entrained therein and at the same time (in particular when providing apertures) to effect sufficient mixing of the exhaust-gas stream. This length detail preferentially relates to honeycomb bodies which have a total length of over 100 mm.

In accordance with yet an added feature of the invention, a single measurement sensor is provided, which is a lambda sensor. In other words, in this case the result is a honeycomb body which has only a single measurement sensor, constructed as a lambda sensor which, however, can at the same time also be used to carry out OBD. This single lambda sensor makes it possible, for example, to detect unburnt hydrocarbons, which occur in particular after the mobile internal combustion engine has been started or restarted (known as a "cold start").

In accordance with yet an additional feature of the invention, the honeycomb body, starting from its peripheral or lateral surface, has a recess, extending radially in the direction of its axis, for accommodating the measurement sensor. The recess preferably has a maximum extent in a range from 15 mm to 35 mm and/or a depth in a range from 15 mm to 40 mm.

The term "peripheral or lateral surface" is to be understood in particular as meaning the envelope of the honeycomb body which is disposed between the two end faces. The "axis" of the honeycomb body relates in particular to a center axis, which preferably extends through the center points of the two end faces. The "recess" or its center axis extends from the lateral surface preferably radially toward the axis. Although at this point it should be noted that this recess may also be disposed skew or obliquely with respect to the axis of the honeycomb body, a radial extent constitutes an embodiment which is preferred herein, since in this way a relatively deep penetration of the measurement sensor can be achieved.

The dimensions indicated should be complied with to ensure that the measurement sensor extends sufficiently far into inner regions of the honeycomb body yet at the same time does not constitute an undesirably major flow resistance. In this context, the "maximum extent" is disposed substantially in a cross section of the recess and describes the distance between the opposite points of the recess disposed furthest away from one another. The "depth" extends radially inward from the peripheral or lateral surface and in this direction describes the dimension of the recess. The number of recesses of this type in the honeycomb body is to be selected by taking into account the number of measurement sensors being used. Under certain circumstances, however, it is also possible for a plurality of measurement sensors to be disposed in one recess.

In accordance with again another feature of the invention, the shape of the recess is oval-cylindrical, quadrilateral or narrows conically in the direction of the axis. For details as to the production of recesses of this type in honeycomb bodies which include a plurality of at least partially structured sheet-metal foils, reference should be made in particular to the disclosure of International Publication No. WO 02/075126, corresponding to U.S. Patent Application Publication Nos. US 2004/0159358 corresponding to co-pending application Ser. No. 10/650,054, and US 2004/0074094 corresponding to co-pending application Ser. No. 10/653,793. The contents thereof are hereby incorporated in full by reference into the subject matter of the instant application, and reference can be made to those contents in full in particular for a more detailed explanation of the invention.

In accordance with again a further feature of the invention, the recess is at least partially surrounded by a section or rim which does not permit exchange of adjacent flows, in particular does not have any apertures. The section or rim preferably has a width in a range of from 1 mm to 5 mm. The configuration of the recess with a section or rim of this type means that its external shape is not delimited by especially fissured passage walls. That could lead to particularly fine subregions of the passage walls being freely exposed to the extreme environmental conditions. Due to the ensuing pressure fluctuations, subregions could become detached or cracks could form, which would then propagate through the passage wall. The provision of the section or rim means that stable passage edge regions are provided in the immediate vicinity of the recess, so as to ensure long-term use of honeycomb bodies of this type.

In accordance with again an added feature of the invention, the honeycomb body has a second measurement sensor, which is disposed between a first measurement sensor (disposed near the first end face and constructed as a lambda sensor) and the second end face. A second partial volume is formed between the second measurement sensor and the first measurement sensor, and a third partial volume is formed between the second measurement sensor and the second end face.

In this respect, the honeycomb body has two measurement sensors, which at least in part project into other regions. The measurement sensors, which are preferably each disposed in a cross-sectional plane parallel to at least one end face of the honeycomb body, in this case define different partial volumes of the honeycomb body. The first measurement sensor preferably has the function of generating certain characteristic variables which provide information as to the fluid flowing in. This means that it is possible to ascertain knowledge as to the composition, concentration differences, temperatures, etc. on the basis of the data obtained by using the first measurement sensor. The second measurement sensor is used in particular to record the functionality of the honeycomb body or its coating by metrological measures. In this case, by way of example, the same parameters which have been recorded by using the first measurement sensor are recorded again, and the two recorded parameters are compared with one another. The rise or drop in this characteristic variable accordingly allows conclusions to be drawn as to the, for example, catalytic activity of the honeycomb body. However, it is also possible for the two measurement sensors to observe different parameters of the fluid or exhaust-gas stream.

In accordance with again an additional feature of the invention, a coating which is at least in part provided in the second partial volume, has an increased capacity to take up oxygen as compared to the first coating in the first partial volume. Accordingly, the second partial volume preferably forms the region of the honeycomb body in which particularly effective conversion of pollutants in an exhaust-gas stream takes place. This preferably achieves an efficiency of over 99%. The higher oxygen uptake capacity of the second oxidizeable coating ensures that the pollutants are brought into contact to a sufficient extent with their reaction partner.

In accordance with still another feature of the invention, the third partial volume at least in part has a third coating, which has a lower catalytic activity than at least the first partial volume and/or the second partial volume. This is to be understood in particular as meaning that a smaller quantity of catalytically active material is provided in this third partial volume. Catalysts of this type are in particular platinum, rhodium or rare earths (i.e. in particular including weakly basic oxides of the rare earths).

In accordance with still a further feature of the invention, at least the second partial volume and/or the third partial volume provides an exchange of fluid flows between adjacent passages. Under certain circumstances, it is advantageous not to permit any exchange of fluid flows between adjacent passages in the second partial volume. This is the case, for example, if the first measurement sensor and the second measurement sensor are in each case supposed to generate measured values to be compared with one another. In order to ensure that the same fluid flows which are routed past the first measurement sensor also flow past the second measurement sensor, cross-mixing between partial fluid flows is to be avoided. If a comparison of this type is not carried out, mixing of partial fluid flows is also advantageous under certain circumstances in the second partial region.

In accordance with still an added feature of the invention, the second measurement sensor is positioned at a distance in a range of from 10 mm to 30 mm from the second end face. The distance described herein constitutes a type of minimum distance which should be ensured starting from the second end face, which in the exhaust train of an automobile usually means the gas exit side. This has the advantage that when establishing that a limit value has been exceeded or undershot at the second measurement location, there is still a third partial volume available, which if necessary continues to convert the pollutants until the engine control has effected a change in the fuel/air mixture in order to restore the functionality of the honeycomb body. This has its origin, inter alia, in the fact that the functionality of a honeycomb body generally changes with a time delay in different regions. Since the exhaust gas, for example, always enters from one end face, this region of the honeycomb body is generally impaired first. This may affect, for example, the capacity to store nitrogen oxides and the capacity to trap particulates or similar components. This "malfunctioning" then continues over the course of time into inner regions until ultimately the change can be detected even at the second measurement location. Accordingly, the minimum distance or the size of the third partial volume represents a safety measure to ensure that the emission limits prescribed by legislation are still complied with even in the event of sudden failure of the honeycomb body (for example as a catalyst carrier body).

In accordance with still an additional feature of the invention, the second measurement sensor is a sensor for monitoring nitrogen oxide levels in the fluid stream. It is already known for an $NO_x$ storage device, which can store the nitrogen oxides produced during operation for a certain period of time, to be provided for example in the exhaust system of a diesel engine or lean-burn engine. Before its storage capacity is exhausted, an $NO_x$ storage device of this type is regenerated by unburnt hydrocarbons being fed to the exhaust system. These hydrocarbons react, if appropriate with the assistance of suitable catalysts, with the stored nitrogen oxides, generally forming the products carbon dioxide, nitrogen and water. Any excess hydrocarbons or hydrocarbons which do not react with the nitrogen oxides, are oxidized in the exhaust system or the honeycomb body using the residual oxygen contained in the exhaust gas, so that the result may be just carbon dioxide and water.

The catalytic conversion can take place in a catalytically active coating of the $NO_x$ storage device itself or in a downstream oxidation catalytic converter. As has already been mentioned above, the honeycomb body itself may have different coatings, for example an oxidation coating with a high oxygen storage capacity or a coating which is able to store $NO_x$. The monitoring of the ability to store $NO_x$ in particular allows statements to be made as to the functioning of the honeycomb body or the combustion of the internal combustion engine at operating temperature.

In accordance with another feature of the invention, the honeycomb body is formed by using at least partially structured sheet-metal foils which delimit the passages. In this case, it is preferable for the honeycomb body to have both smooth and structured sheet-metal foils which are stacked on top of one another and wound together. The profiles of the sheet-metal foils may be in a spiral shape, an S-shape or a similar intertwined configuration. These honeycomb bodies have a cell density which is preferably in a range of from 200 to 1000 cpsi (cells per square inch), in particular in a range of from 400 to 800 cpsi. The sheet-metal foil thickness in this case is preferably less than 100 μm, in particular in a range from 20 to 80 μm. Temperature-resistant and corrosion-resistant aluminum/chromium alloys are preferred as material for the sheet-metal foils.

In accordance with a further feature of the invention, the honeycomb body is surrounded by a housing which has at least one cutout that is used for the gastight fixing of the at least one measurement sensor. The housing substantially ensures the structural integrity of the honeycomb body. The passage walls or sheet-metal foils are preferably non-releasably connected to the housing. This is to be understood as meaning that they can only be detached from one another again as a result of damage to or destruction of the honeycomb body or the housing. The housing proposed is likewise a metallic tubular casing, in which case the passage walls are preferably welded or brazed to the housing. The cutout is in this case positioned substantially above the recess, so that the at least one measurement sensor can be passed through it from the outside. Special sealing measures can be provided to make the cutout gastight. It is also possible for an additional housing or a sleeve to be fitted or welded onto the housing, and likewise aligned above the cutout.

With the objects of the invention in view, there is also provided an exhaust system. The exhaust system comprises a pipe section for positioning components for exhaust-gas aftertreatment. The pipe section has a longitudinal axis, a base with a lowest point, and a secondary axis intersecting the longitudinal axis and the lowest point of the base. At least one honeycomb body assembly according to the invention is disposed in the pipe section. The at least one measurement sensor is positioned within an angular range of 270° disposed opposite the lowest point of the base.

The term exhaust system is to be understood in particular as meaning an exhaust system of mobile internal combustion engines, i.e. of automobiles, motorcycles, trucks or similar vehicles. The exhaust system is usually connected to the internal combustion engine and has an opening to the environment, from which the exhaust gas that is produced, after first being treated, flows out. If appropriate, a plurality of different components for exhaust-gas aftertreatment, such as for example filter elements, adsorbers, heating elements, particulate separators, catalytic converters, etc., are disposed in a pipe section, which preferably has a widened structure. If appropriate, this exhaust system may be equipped with additional nozzles, sensors or feed lines for reducing agents or oxidizing agents. The configuration of the at least one measurement sensor will now be described with reference to the longitudinal axis and the lowest point of the base of the pipe section. The invention in this regard proposes a particularly wide angle range, namely of 270°. Heretofore, measurement sensors of this type have only been disposed in a very limited angular range opposite the lowest point of the base. This was done in particular with a view toward the condensation water which may form in the pipe section in the vicinity of the base, which has an adverse effect on the measurement result acquired by using the at least one measurement sensor. However, this risk of accumulation of liquids is considerably reduced due to the configuration of the recess and the provision of apertures. Therefore, it is possible to vary the configuration within a particularly wide angular range.

In accordance with a concomitant feature of the invention, in this context it is very particularly advantageous if the at least one measurement sensor is positioned in an angular range of 45° which extends from a tertiary axis extending perpendicular to the secondary axis and through the longitudinal axis, toward the lowest point of the base. This is to be understood as meaning in particular that the at least one measurement sensor is disposed below a horizontal through the longitudinal axis of the pipe section. More detailed explanations as to this configuration of the at least one measurement sensor will be provided with reference to the figures.

Other features which are considered as characteristic for the invention are set forth in the appended claims.

Although the invention is illustrated and described herein as embodied in a coated honeycomb body assembly with a measurement sensor and an exhaust system having the assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
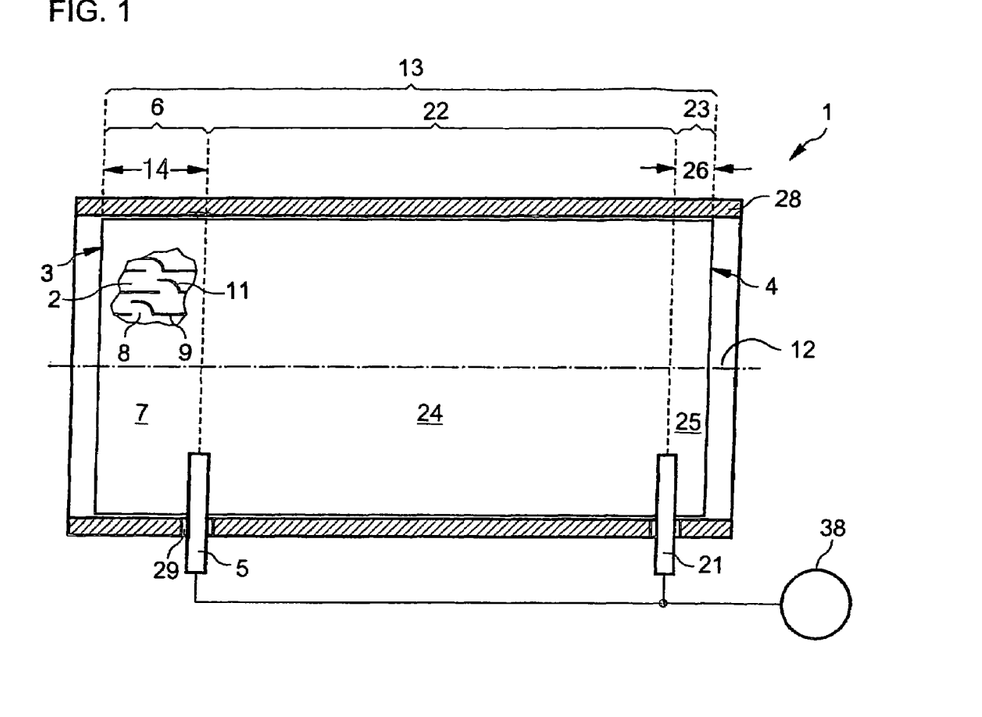
FIG. 1 is a diagrammatic, partly broken-away, longitudinal-sectional view of a first embodiment of the honeycomb body according to the invention.

Referring now to the figures of the drawings in detail and first, particularly, to FIG. 1 thereof, there is seen a diagrammatic, longitudinal section through a first embodiment of a honeycomb body 1 according to the invention, with passages 2 through which a fluid can flow and which extend between two end faces 3, 4. The honeycomb body 1 includes a housing 28, through which two measurement sensors 5, 21 extend, through cutouts 29, into inner regions of the honeycomb body 1. Both measurement sensors 5, 21 are connected to a measurement data recorder 38, which preferably interacts with an engine control or a non-illustrated internal combustion engine.

The honeycomb body 1 has a total volume 13, which is divided into a first partial volume 6, a centrally disposed, second partial volume 22 and a third partial volume 23. The partial volumes 6, 22, 23 are substantially defined by the position of the measurement sensors 5, 21 and the two end faces 3, 4. The first partial volume 6 has a length or distance 14 extending from the first end face 3 as far as a cross-sectional plane through the honeycomb body 1, which is substantially defined by the position of the first measurement sensor 5. The second partial volume 22 is disposed between the first measurement sensor 5 and the second measurement sensor 21 and is once again defined by the position of these measurement sensors. The third partial volume 23 is defined by the position of the second measurement sensor and the second end face 4, so as to form a length or distance 26.

The honeycomb body 1 has different coatings in each of the partial volumes 6, 22, 23. In the first partial volume 6 there is a first coating 7, which has a low oxygen storage capacity or absorption capability. In the second partial volume 22 there is a second coating 24, which has a higher oxygen storage capacity or absorption capability than the coating 7 in the first partial volume 6. In the third partial volume 23 there is a third coating 25, which is distinguished by a reduced catalytic activity compared to the coating 24.

The honeycomb body 1 has a multiplicity of the passages 2 which are disposed substantially parallel to one another and in this case preferably continue parallel to an axis 12 of the honeycomb body 1 through the interior of the latter. In the illustrated embodiment, the passages 2 in the first partial volume 6 are formed in such a way that they ensure an exchange of fluid flows between adjacent passages 2. For this purpose, apertures 8 and microstructures 11 are provided in passage walls 9.

Figure 2:
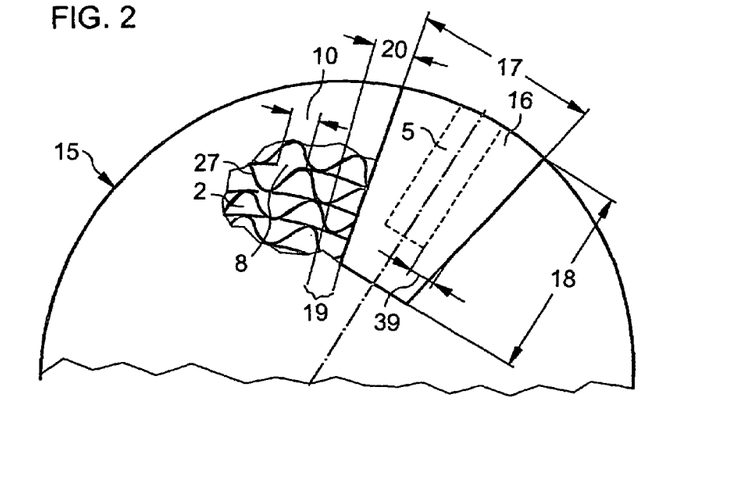
FIG. 2 is a fragmentary, enlarged, partly cross-sectional view of a further embodiment of the honeycomb body.

FIG. 2 shows a diagrammatic, sectional illustration of a further embodiment of the honeycomb body 1, which is formed by using smooth and structured sheet-metal foils 27. The sheet-metal foils 27 are equipped with apertures 8 which have a mean diameter 10 in a range of from 2 mm to 10 mm. The at least partially structured sheet-metal foils 27 in turn delimit the passages 2.

Starting from its peripheral, lateral or jacket surface 15, the honeycomb body 1 has a recess 16 extending radially in the direction of its axis 12 for accommodating the measurement sensor 5. The recess 16 has a maximum extent 17 and a depth 18. The measurement sensor 5 is disposed in such a way as to ensure a distance from the boundary of the recess 16 which is preferably in a range of from 3 to 20 mm. A rim, margin or edge 19 which has a width 20 of preferably between 1 mm and 5 mm is provided around the recess 16. No exchange of adjacent flows is possible within this rim 19, since in this section or rim 19 the sheet-metal foils 27 do not have any apertures 8 and/or microstructures 11.

Figure 3:
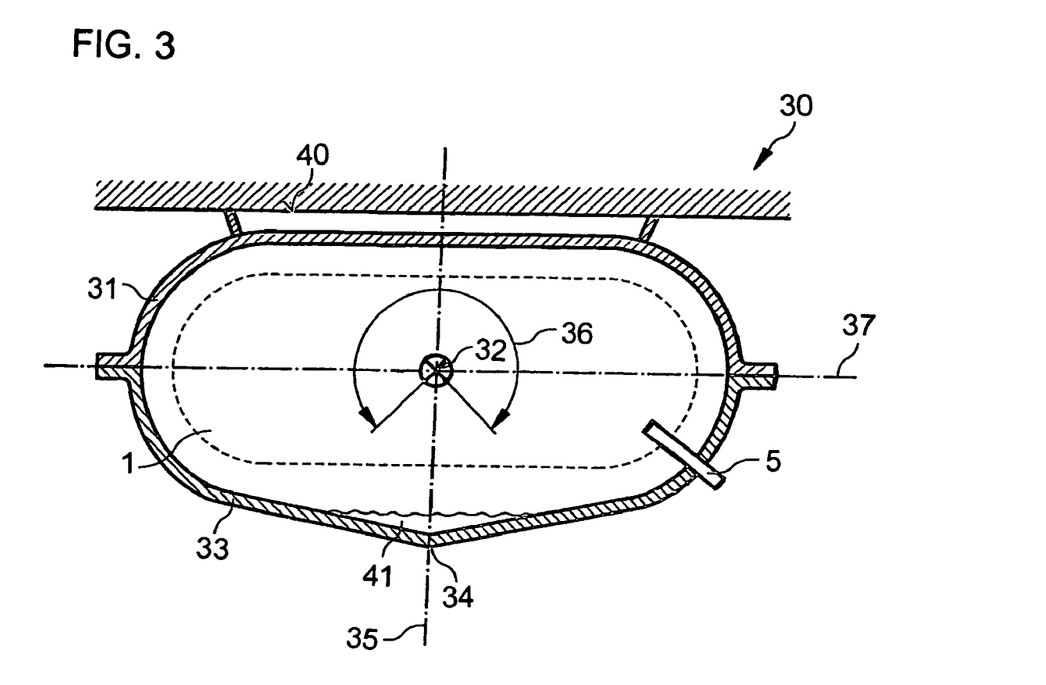
FIG. 3 is a cross-sectional view of a configuration of an embodiment of the honeycomb body in an exhaust system.

FIG. 3 diagrammatically depicts a configuration of an exhaust system 30 secured to a bearing surface 40, such as may be provided, for example, on an automobile. The exhaust system 30 includes a pipe section 31 for positioning components for exhaust-gas aftertreatment, with a honeycomb body 1 being indicated in this case. The pipe section 31 has a longitudinal axis 32 and a base 33, defining a secondary axis 35 which intersects the longitudinal axis 32 and a lowest point 34 of the base 33. The measurement sensor 5 is positioned within an angle range 36 of 270° located opposite the lowest point 34 of the base 33. In the embodiment illustrated herein, the measurement sensor 5 is positioned in an angle range of 45° which extends from a tertiary axis 37, extending perpendicular to the secondary axis 35 and extending through the longitudinal axis 32, toward the lowest point 34 of the base 33. Placing the measurement sensor 5 in the angle range 36 means that it does not come into contact with a liquid 41 which collects in the vicinity of the lowest point 34 of the base 33. At the same time, however, it is possible for the pipe section 31 to be positioned close to the bearing surface 40, since the region lying precisely opposite the lowest point 34 does not necessarily have to be used to position the measurement sensor 5.

We claim:

1. A honeycomb body assembly, comprising:
a honeycomb body having one partial volume, at least one further partial volume, a first end face, a second end face and passages through which a fluid can flow, said passages extended between said first end face and said second end face; and
at least one measurement sensor at least partially extended into said honeycomb body;
said one partial volume being disposed between said first end face and said at least one measurement sensor, said one partial volume having an exchange of fluid flows between adjacent passages and having passage walls defining said passages, said passage walls having apertures formed therein at least in said one partial volume, and said one partial volume having a lower capacity to take up oxygen than said at least one further partial volume; said at least one further partial volume having passage walls, and
said passage walls do not permit an exchange of fluid flows between adjacent passages.

2. The honeycomb body assembly according to claim 1, which further comprises a coating disposed in at least part of said one partial volume.

3. The honeycomb body assembly according to claim 1, wherein said apertures have a mean diameter in a range from 2 mm to 10 mm.

4. The honeycomb body assembly according to claim 1, wherein said apertures have microstructures, at least in said one partial volume.

5. The honeycomb body assembly according to claim 4, wherein said honeycomb body has an axis, and said microstructures divert the fluid in a direction transverse to said axis.

6. The honeycomb body assembly according to claim 1, wherein said honeycomb body has a total volume, and said one partial volume lies in a region of less than 30% of said total volume.

7. The honeycomb body assembly according to claim 1, wherein said honeycomb body has a total volume, and said one partial volume lies in a region of from 10% to 25% of said total volume.

8. The honeycomb body assembly according to claim 1, wherein said one partial volume has a length of from 10 mm to 40 mm, starting from said one end face.

9. The honeycomb body assembly according to claim 1, wherein said at least one measurement sensor is a single lambda measurement sensor.

10. The honeycomb body assembly according to claim 1, wherein said honeycomb body has an axis, a peripheral surface, and a recess starting from said peripheral surface and extending radially in direction of said axis, for accommodating said at least one measurement sensor.

11. The honeycomb body assembly according to claim 10, wherein said recess has at least one of a maximum extent in a range from 15 mm to 35 mm or a depth in a range from 15 mm to 40 mm.

12. The honeycomb body assembly according to claim 10, wherein said recess has a shape selected from the group consisting of oval-cylindrical, quadrilateral, and narrowing conically in direction of said axis.

13. The honeycomb body assembly according to claim 10, wherein said honeycomb body has a section at least partially surrounding said recess and not permitting exchange of adjacent flows.

14. The honeycomb body assembly according to claim 13, wherein said section has no apertures.

15. The honeycomb body assembly according to claim 14, wherein said section has a width in a range from 1 mm to 5 mm.

16. The honeycomb body assembly according to claim 1, wherein:
said at least one measurement sensor is a first measurement sensor disposed near said one end face and constructed as a lambda sensor;
a second measurement sensor is disposed between said first measurement sensor and said second end face;
said one partial volume is a first partial volume;
a second partial volume is disposed between said second measurement sensor and said first measurement sensor; and
a third partial volume is disposed between said second measurement sensor and said second end face.

17. The honeycomb body assembly according to claim 16, which further comprises a first coating disposed in said first partial volume, and a second coating disposed in at least part of said second partial volume, said second coating having a greater capacity to take up oxygen than said first coating.

18. The honeycomb body assembly according to claim 17, which further comprises a third coating disposed in at least part of said third partial volume, said third coating having a lower catalytic activity than at least one of said first or second partial volumes.

19. The honeycomb body assembly according to claim 16, wherein at least one of said second or third partial volumes provide for an exchange of fluid flows between adjacent passages.

20. The honeycomb body assembly according to claim 16, wherein said second measurement sensor is positioned at a distance in a range of from 10 mm to 30 mm from said other end face.

21. The honeycomb body assembly according to claim 16, wherein said second measurement sensor is a sensor for monitoring nitrogen oxide levels in a fluid flow.

22. The honeycomb body assembly according to claim 1, wherein said honeycomb body is formed of at least partially structured sheet-metal foils defining said passages.

23. The honeycomb body assembly according to claim 1, which further comprises a housing surrounding said honeycomb body, said housing having at least one cutout formed therein for gastight fixing of said at least one measurement sensor.

24. An exhaust system, comprising:
a pipe section for positioning components for exhaust-gas after treatment, said pipe section having a longitudinal axis, a base with a lowest point, and a secondary axis intersecting said longitudinal axis and said lowest point of said base; and
at least one honeycomb body assembly disposed in said pipe section, said at least one honeycomb body assembly containing: a honeycomb body having one partial volume, at least one further partial volume, a first end face, a second end face and passages through which a fluid can flow, said passages extended between said first end face and said second end face; and at least one measurement sensor at least partially extended into said honeycomb body; said one partial volume being disposed between said first end face and said at least one measurement sensor, said one partial volume having an exchange of fluid flows between adjacent passages and having passage walls defining said passages, said passage walls having apertures formed therein at least in said one partial volume, and said one partial volume having a lower capacity to take up oxygen than said at least one further partial volume; said at least one further partial volume having passage walls, and said passage walls do not permit an exchange of fluid flows between adjacent passages; said at least one measurement sensor being positioned within an angular range of 270° disposed opposite said lowest point of said base.

25. The exhaust system according to claim 24, wherein said pipe section has a tertiary axis extended perpendicular to said secondary axis and extended through said longitudinal axis, and said at least one measurement sensor is positioned within an angular range of 45° extended from said tertiary axis toward said lowest point of said base.

* * * * *